US012572801B2

(12) United States Patent
Fisher et al.

(10) Patent No.: US 12,572,801 B2
(45) Date of Patent: Mar. 10, 2026

(54) METHOD FOR CHARACTERIZING A PART THROUGH NON-DESTRUCTIVE INSPECTION

(71) Applicant: COMMISSARIAT A L'ENERGIE ATOMIQUE ET AUX ENERGIES ALTERNATIVES, Paris (FR)

(72) Inventors: Clement Fisher, Orsay (FR); Roberto Miorelli, Gif-sur-Yvette (FR); Olivier Mesnil, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 467 days.

(21) Appl. No.: 18/042,152

(22) PCT Filed: Aug. 17, 2021

(86) PCT No.: PCT/EP2021/072868
§ 371 (c)(1),
(2) Date: Feb. 17, 2023

(87) PCT Pub. No.: WO2022/038159
PCT Pub. Date: Feb. 24, 2022

(65) Prior Publication Data
US 2024/0013044 A1     Jan. 11, 2024

(30) Foreign Application Priority Data
Aug. 19, 2020   (FR) ..................................... 20 08565

(51) Int. Cl.
*G06N 3/08*       (2023.01)
*G01N 21/88*      (2006.01)
(Continued)

(52) U.S. Cl.
CPC ............... *G06N 3/08* (2013.01); *G01N 21/88* (2013.01); *G01N 23/02* (2013.01); *G01N 25/72* (2013.01);
(Continued)

(58) Field of Classification Search
CPC .... G01J 2003/2826; G01J 3/28; G01J 3/2823; G06N 3/08; G06N 3/045; G06N 3/084;
(Continued)

(56) References Cited

U.S. PATENT DOCUMENTS

2019/0094124 A1     3/2019   Amer et al.
2019/0236447 A1*    8/2019   Cohen .................... G06N 3/092
(Continued)

FOREIGN PATENT DOCUMENTS

FR          2 721 111 A1     12/1995
FR          3 075 376 A1      6/2019

OTHER PUBLICATIONS

International Search Report issued Nov. 3, 2021 in PCT/EP2021/072868, filed on Aug. 17, 2021, 4 pages.
(Continued)

*Primary Examiner* — Mohammad K Islam
(74) *Attorney, Agent, or Firm* — Oblon, McClelland, Maier & Neustadt, L.L.P.

(57) ABSTRACT

A method is provided for characterizing a part. The method includes a) carrying out non-destructive measurements using a sensor, the sensor being placed on the part or facing the part; b) using the measurements as input data of a neural network; and c) depending on the value of each node of the output layer of the neural network, characterizing the part. The method further includes prior to steps b) and c): constructing a first database, on a first model part; employing a first neural network parametrized by a first training operation, using the first database; constructing a second
(Continued)

database, containing experimental measurements of the physical quantity performed on the part to be characterized; a second training operation, using the second database, so as to parametrize a second neural network, using the parametrization of the first neural network. In step c), the neural network used is the second neural network.

19 Claims, 8 Drawing Sheets

(51) Int. Cl.

| | |
|---|---|
| *G01N 23/02* | (2006.01) |
| *G01N 25/72* | (2006.01) |
| *G01N 27/90* | (2021.01) |
| *G01N 29/44* | (2006.01) |
| *G06N 3/0455* | (2023.01) |

(52) U.S. Cl.
CPC ..... *G01N 27/9046* (2013.01); *G01N 29/4481* (2013.01); *G06N 3/0455* (2023.01); *G01N 2201/126* (2013.01)

(58) Field of Classification Search
CPC ........ G06N 3/047; G06N 3/044; G06N 3/082; G06N 3/048; G06N 3/088; G06N 20/00; G06N 20/10; G06N 3/006; G06N 3/04; G06N 3/063; G06N 5/02; G06N 5/04; G06N 7/01; G06N 3/0455; G01N 21/88; G01N 23/02; G01N 25/72; G01N 27/9046; G01N 29/4481; G01N 2201/126
See application file for complete search history.

(56) References Cited

U.S. PATENT DOCUMENTS

| | | | | |
|---|---|---|---|---|
| 2020/0005140 | A1* | 1/2020 | Cherian | G06N 3/0455 |
| 2021/0157282 | A1* | 5/2021 | Abeloe | G06N 3/045 |
| 2022/0276207 | A1* | 9/2022 | Belanger | G01N 29/262 |
| 2022/0366245 | A1* | 11/2022 | Guez | G06N 3/0464 |

OTHER PUBLICATIONS

Numan Saeed et al., "Automatic defects detection in CFRP thermograms, using convolutional neural networks and transfer learning", Infrared Physics & Technology, 102, 2019, 8 pages.

Mei Zhang et al., "Two-step Convolutional Neural Network for Image Defect Detection", Proceedings of the 38th Chinese Control Conference, 2019, 6 pages 8525-8530.

S. Vallerand et al., "Defect characterization in pulsed thermography: a statistical method compared with Kohonen and Perceptron neural networks", NDT & E International 33, 2000, pp. 307-315.

F.W. Margrave et al., "The use of neural networks in ultrasonic flaw detection", Measurement 25 (1999) pp. 143-154.

Nauman Munir et al., "Performance enhancement of convolutional neural network for ultrasonic flaw classification by adopting autoencoder", NDT & E International 111, 2020, 13 pages.

Pei Cao, "Pre-Processing-Free Gear Fault Diagnosis Using Small Datasets with Deep Convolutional Neural Network-Based Transfer Learning", 16 pages.

Qing Liu et al., "A Fault Diagnosis Method Based on Transfer Convolutional Neural Networks", IEEE Access, vol. 7, 2019, pp. 171423-171430.

Mingliang Bai et al., "Convolutional neural network-based deep transfer learning for fault detection of gas turbine combustion chambers", Applied Energy 302, 2021, 24 pages.

* cited by examiner

METHOD FOR CHARACTERIZING A PART THROUGH NON-DESTRUCTIVE INSPECTION

TECHNICAL FIELD

The technical field of the invention is interpretation of non-destructive-testing measurements carried out on a mechanical part or a portion of a structure.

PRIOR ART

NDT, meaning non-destructive testing, consists in monitoring parts or mechanical structures, using sensors, in a non-destructive way. The objective is to perform a test and/or to detect and monitor for the appearance of structural defects. This involves monitoring the integrity of a tested part, so as to prevent the occurrence of accidents, or to extend the time for which the part may be safely used.

NDT is commonly implemented on sensitive equipment, so as to optimize replacement or maintenance thereof. It has many applications to testing industrial equipment, for example in the petroleum industry, in the nuclear industry, or in the transportation field (aeronautics for example).

A subset of NDT is designated by the term SHM, meaning Structural Health Monitoring. In this type of application, the sensors may be placed in situ on or within a structural element to be tested. This allows the structural element to be regularly monitored. SHM may be adapted to testing of elements considered sensitive, for example in the field of aeronautics.

The sensors used in the NDT are non-destructive sensors that cause no damage to the tested parts. The tested parts may be structural elements of industrial equipment or aircrafts, or of civil engineering works (bridges or dams for example). Various methods are implemented. They may for example employ X-rays, or ultrasonic waves or detection via eddy currents.

During use thereof, the sensors are connected to computing means, so as to make it possible to interpret the performed measurements. The presence of a defect, in a part, leads to a defect signature that is measurable by a sensor. The computing means perform an inversion. It is a question, based on the measurements, of obtaining quantitative data relating to the defect (for example its position, or its shape, or its dimensions).

The inversion may be carried out using direct analytical models (polynomial models for example) allowing a relationship to be established between the features of a defect and the measurements delivered by a sensor. The inversion of the model allows said features to be estimated based on the measurements carried out.

According to another approach, the features of the defects may be estimated using supervised artificial-intelligence algorithms, neural networks for example. However, one difficulty associated with use of neural networks is the need to perform a complete-as-possible training phase, so as to optimize the performance of the estimation. This takes time and requires a lot of data.

The inventors have provided a method that addresses this problem. The objective is to make it easier to train a neural network intended to perform an inversion, while maintaining a good diagnostic performance, for example in the estimation of the thermal or mechanical features of the part.

SUMMARY OF THE INVENTION

A first subject of the invention is a method for characterizing a part, comprising the following steps:

a) carrying out non-destructive measurements using a sensor, the sensor being placed on the part or facing the part, and being configured to measure a physical quantity allowing a characterization of the part, in particular a mechanical or thermal characterization of the part;

b) using the measurements as input data of a neural network, the neural network comprising an input layer, established using the input data, and an output layer, comprising at least one node;

c) depending on the value of the node or of each node of the output layer of the neural network, characterizing the part;

the method comprising, prior to steps b) and c):

constructing a first database, the first database containing measurements of the physical quantity, said measurements being performed or simulated, on a first model part;

employing a first neural network, the first neural network being parametrized by a first training operation, using the first database;

the method being characterized in that it also comprises:

constructing a second database, containing experimental measurements of the physical quantity performed on the part to be characterized;

a second training operation, using the second database, so as to parametrize a second neural network, the second training operation using the parametrization of the first neural network;

such that in step c), the neural network used is the second neural network, resulting from the second training operation.

Thus, whereas the first training operation is performed based on measurements performed or simulated on a first model part, which may be different from the part to be characterized, the second training operation is performed on the part to be characterized itself. The first part may be a real part, different from the part to be characterized, or a modeled part, which may represent the part to be characterized.

By physical quantity allowing a mechanical or thermal characterization of the part, what is meant is a mechanical or electrical or electromagnetic or acoustic or thermal quantity.

The method may be such that:

the first neural network comprises an input layer and an output layer, and optionally an intermediate layer, between the input layer and the output layer;

the second training operation comprises adapting the output layer and/or the optional intermediate layer of the first neural network, so as to form a layer of the second neural network.

According to one embodiment, the first neural network is a convolutional neural network, comprising an extracting block and a processing block, the first neural network being such that:

the extracting block is configured to extract features from the input data of the first neural network, the input data resulting from the first database;

the processing block is configured to process features extracted by the extracting block;

the second neural network is a convolutional neural network, comprising:

the extracting block of the first neural network;

and a classifying block, the classifying block being configured to perform a classification of the features extracted by the extracting block, the classifying block outputting to the output layer of the second neural network.

3

The processing block of the first neural network may be a classifying block, configured, in the first training operation, to perform a classification of the features extracted by the extracting block.

The first neural network may be an autoencoder, the processing block of the first neural network being configured, in the first training operation, to reconstruct data obtained from the first database, and forming input data of the first neural network.

According to one embodiment, the first and second neural networks are multilayer perceptrons.

The first neural network may be used to initialize the training of all or some of the second neural network.

In the second training operation and in the course of at least one step a), or even each step a), subsequent to the second training operation, the sensor may be placed in situ, installed on the part.

The part may be liable to comprise a defect. Step c) may comprise detecting the presence of a defect in the part, and optionally characterizing the detected defect.

The characterization of the part may comprise:
identification of the type of defect, among predetermined types;
and/or estimation of at least one dimension of the defect;
and/or location of the defect in the part;
and/or determination of a number of defects in the part.

The first database may comprise measurements performed or simulated on a model part comprising the defect.

The defect may be of the following type: delamination, and/or crack, and/or perforation and/or crack propagating from a perforation and/or presence of a porous region and/or presence of an inclusion and/or presence of corrosion.

The part may be made of a composite, comprising components assembled with one another. The defect may then be an assembly defect between the components.

The measurements may be representative of a spatial distribution:
of electrical or magnetic or mechanical properties of the part;
of a property of propagation of an acoustic or mechanical or electromagnetic wave through or along the part;
of a property of reflection of an acoustic or mechanical or visible or infrared electromagnetic wave by the part.

The characterization of the part may comprise a variation in the spatial distribution with respect to a reference spatial distribution.

The characterization of the part may comprise:
obtaining a temperature of the part or a stress, notably a mechanical stress, to which the part is subjected;
or obtaining a spatial distribution of a temperature of the part, or of a stress to which the part is subjected.

The measurements may be of the following type:
measurements of eddy currents formed in the part under the effect of excitation of the part by a magnetic field;
or measurements of acoustic or mechanical waves propagating through or along the part;
or measurement of a light wave reflected by the part when the part is illuminated by an incident light wave, in particular in the infrared or visible domains;
or measurements of the transmission of X-ray or gamma radiation through the part when said part is irradiated by a source of X-ray or gamma radiation.

The second database may comprise a number of data lower than the number of data of the first database.

The invention will be better understood on reading the text describing examples of embodiment that are given, in the rest of the description, with reference to the figures listed below.

FIGURES

FIGS. 1A and 1B schematically show eddy-current-based measurements being taken on a conductive part.

Figure 4:
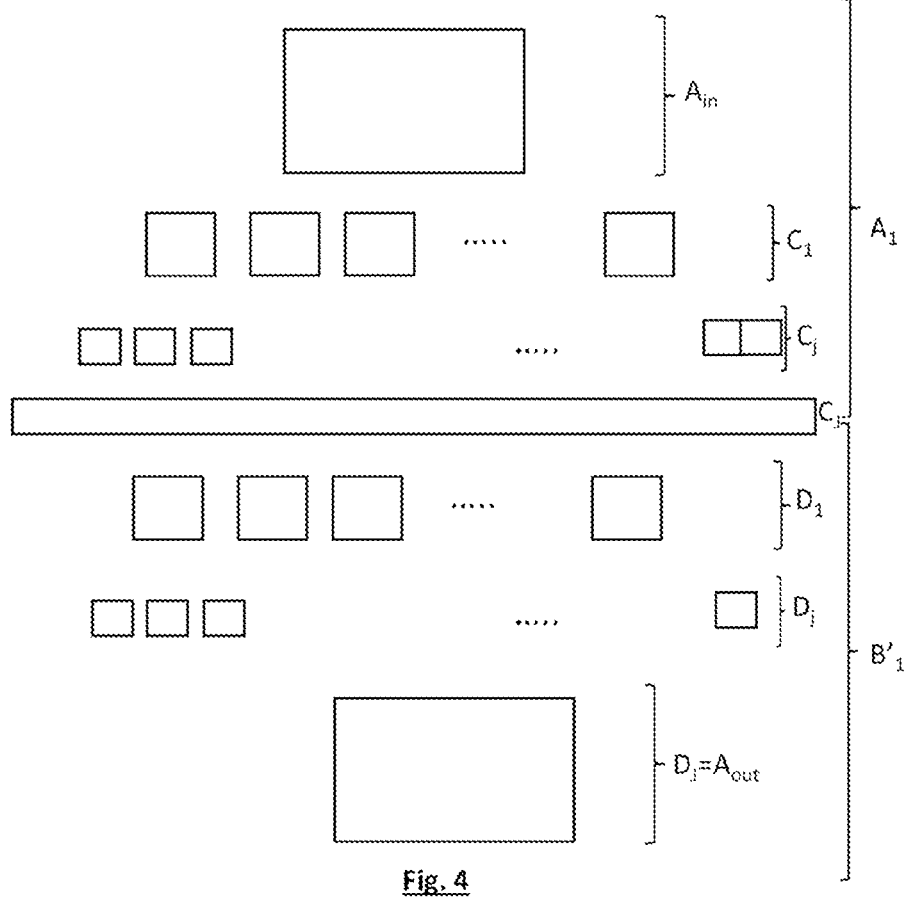

FIG. 4 schematically shows a neural network implemented in a second embodiment.

Figure 5:
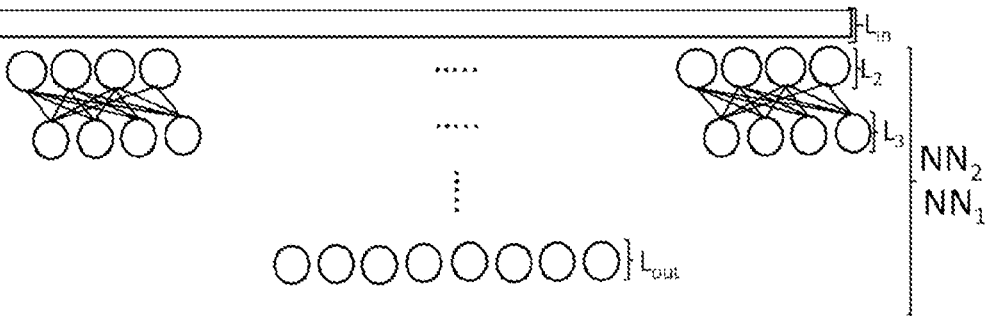

FIG. 5 schematically shows a neural network implemented in a third embodiment.

Figure 6A:
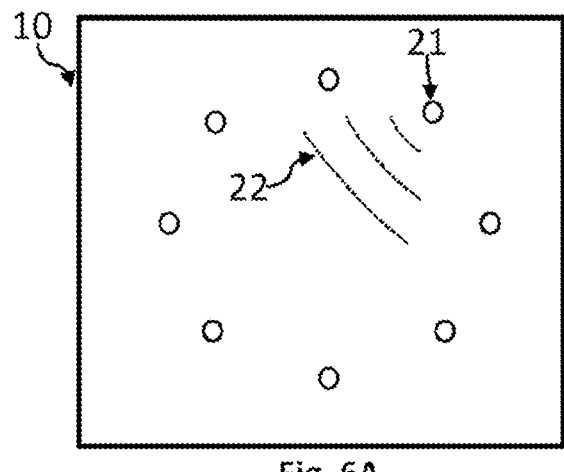

FIG. 6A shows a measurement configuration according to the third embodiment.

Figure 6B:
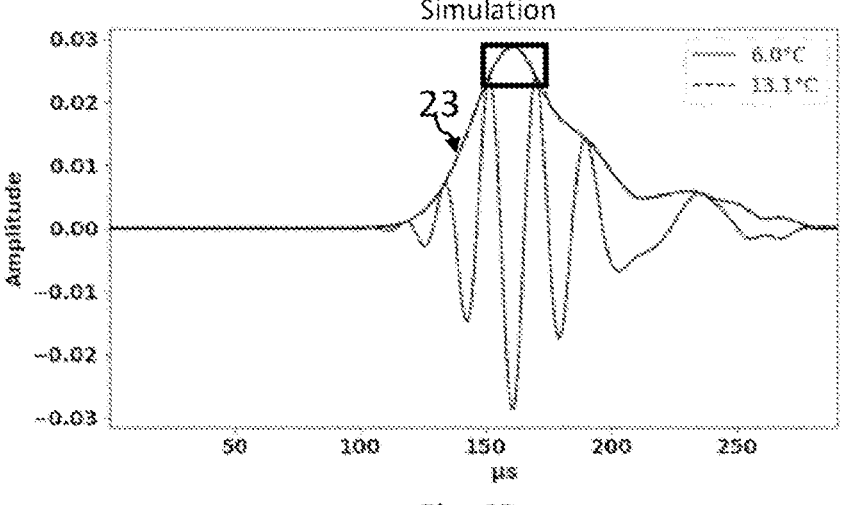

FIG. 6B shows a simulation of propagation of a bending wave through a plate.

Figure 6C:
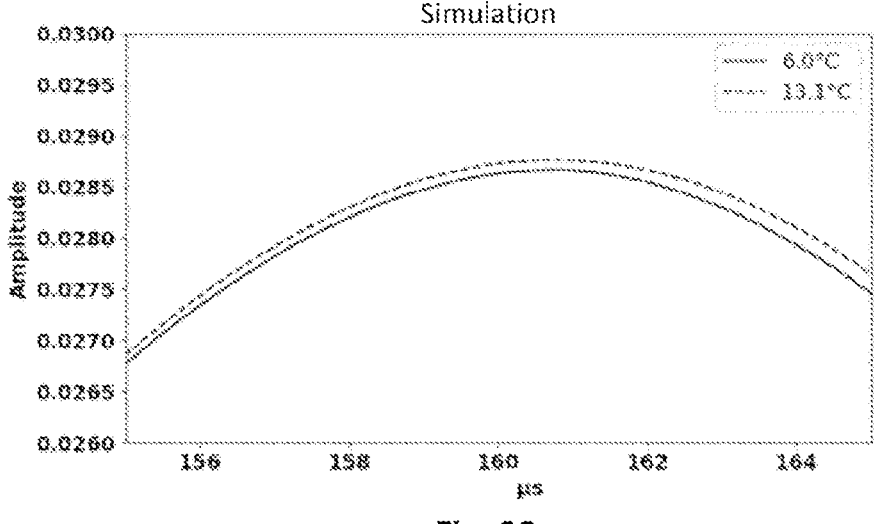

FIG. 6C is a detail of FIG. 6B.

Figure 6D:
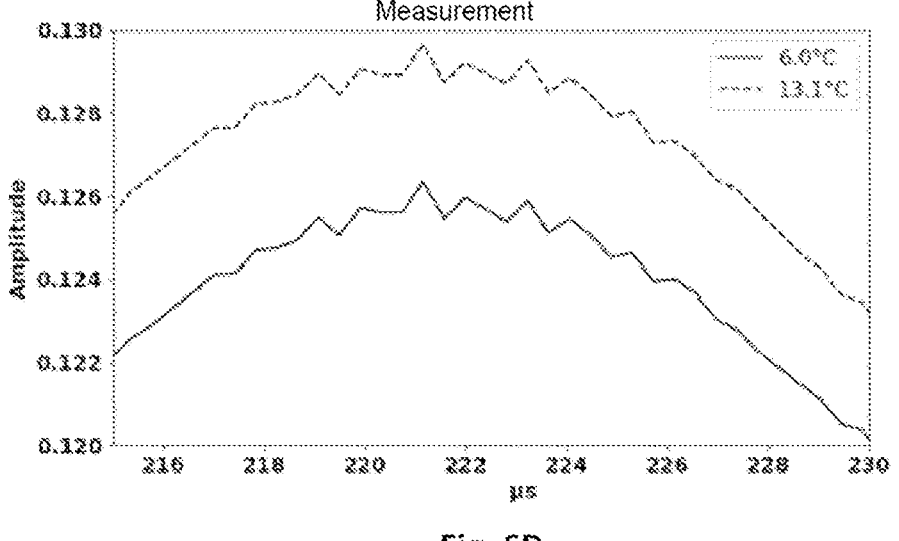

FIG. 6D shows an envelope of a bending wave propagating through a part. FIG. 6D was obtained experimentally.

Figure 6E:
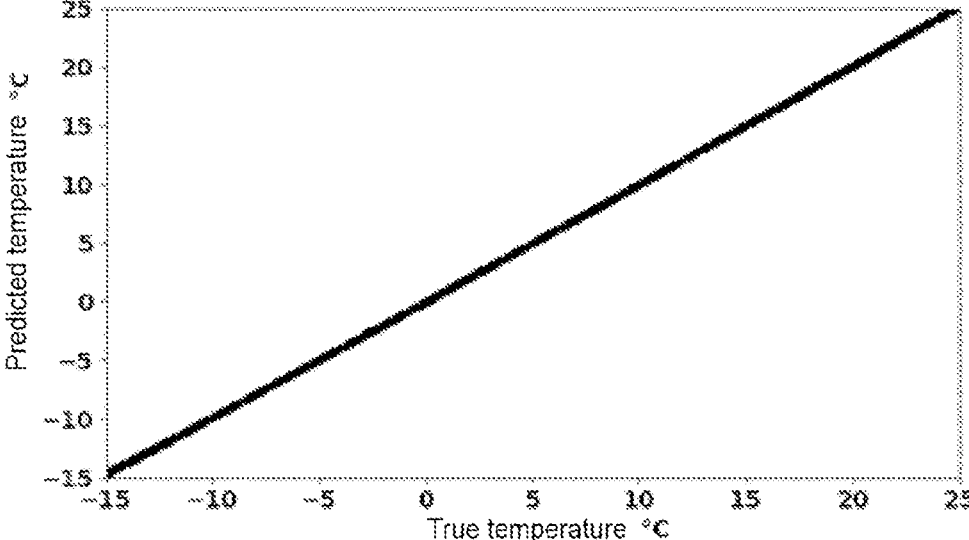

FIG. 6E shows the estimation performance of a first neural network obtained considering a first database.

Figure 6F:
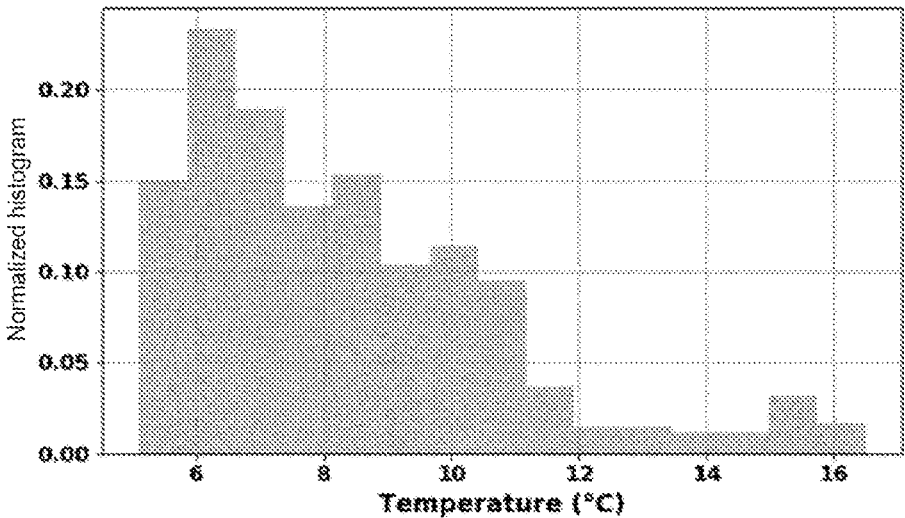

FIG. 6F is a histogram of temperatures taken into account to form a second database.

Figure 6G:
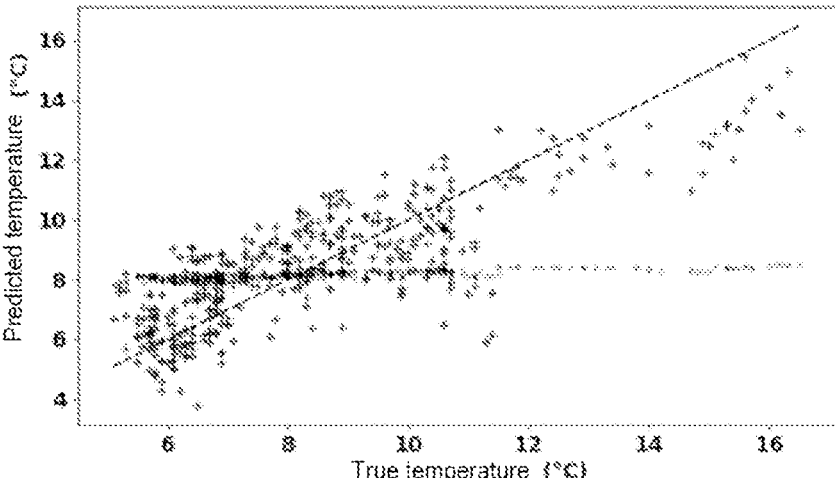

FIG. 6G shows the respective estimation performance of a second neural network, obtained by implementing the invention (crosses), and of a base-line neural network, parametrized only with the second database (dots).

DESCRIPTION OF PARTICULAR EMBODIMENTS

Figure 1A:
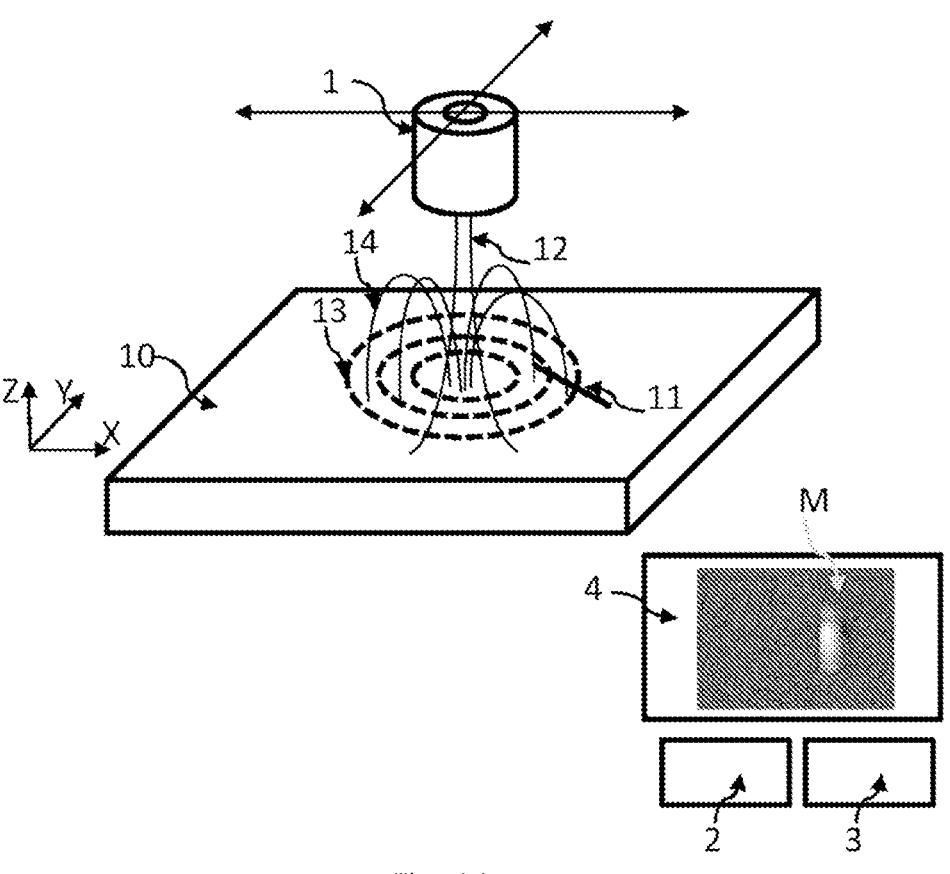
Figure 1B:
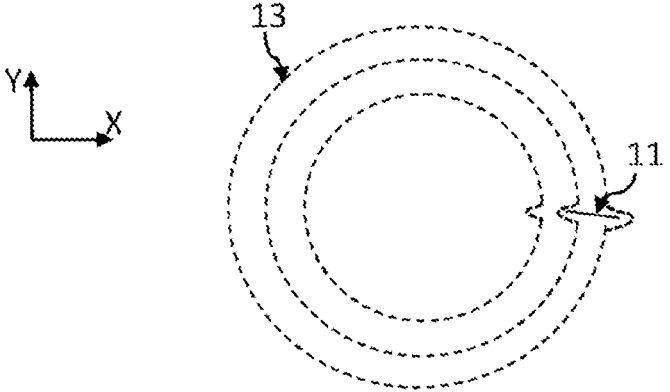

FIGS. 1A and 1B schematically show an example of application of the invention. A sensor 1 is placed facing a part 10 to be tested, so as to characterize the part. It may notably be a question of a thermal or mechanical characterization. By thermal or mechanical characterization, what is meant is a characterization of the thermal or mechanical properties of the part: temperature, deformation, structure.

The part to be characterized may be a monolithic part, or a more complex part resulting from an assembly of a plurality of elementary parts, for example a lifting surface of an airplane wing or a skin of a fuselage.

The characterization may consist in detecting a potential presence of a structural defect 11. In this example, the sensor 1 is configured to perform measurements using eddy currents generated in the part 10 to be tested. The latter is an electrically conductive part. The principle of eddy-current-based non-destructive measurements is known. Under the effect of excitation by a magnetic field 12, eddy currents 13 are induced in the part 10. In the example shown, the sensor 1 is a coil, energized by an amplitude-modulated current.

The coil generates a magnetic field 12, the field lines of which have been shown in FIG. 1A. Eddy currents 13 are induced, forming current loops in the part 10. The eddy currents 13 generate a magnetic reaction field 14, the latter affecting the impedance of the coil 1. Thus, the measurement of the impedance of the coil 1 is representative of the eddy currents 13 formed in the part 10. In the presence of a defect 11, as schematically shown in FIG. 1B, the eddy currents 13 are modified, this resulting in a variation in the impedance of the coil. Thus, the measurement of the impedance of the coil constitutes a signature of the defect.

In this example, the sensor 1 is used to excite the part 10, and as sensor of the reaction of the part to the excitation. Generally, the sensor is moved along the part, parallel thereto. In the example shown, the part extends along an axis X and an axis Y. The sensor can be moved parallel to each axis, this having been represented by the double-headed arrows. Alternatively, a matrix array of sensors may be employed.

A series of measurements, forming a preferably two-dimensional spatial distribution of a measured quantity, in this case the impedance of the sensor 1, is thus obtained. It is conventional to distinguish between the real and imaginary parts of the impedance. The measured impedance is generally compared to an impedance in the absence of defect, so as to obtain a map of the impedance variation $\Delta H$. A measurement matrix M representing the real part or the imaginary part of the impedance measured at each measurement point may be formed.

The sensor 1 is connected to a processing unit 2, comprising a memory 3 containing instructions allowing implementation of a measurement-processing algorithm, the main steps of which are described below. The processing unit is usually a computer, connected to a display 4.

As described in connection with the prior art, the measurement matrix M corresponds to a spatial distribution of the response of the part to excitation, each measurement being a signature of the part. An inversion must be performed, so as to make it possible to conclude that a defect is present, and, where appropriate, to characterize the latter. The inversion is performed by the processing algorithm implemented by the processing unit 2.

By structural defect, what is meant is a mechanical defect affecting the part. It may notably be a question of a crack, or of a delamination, or of a perforation (for example forming a through-hole), or of a crack propagating from a hole, or of an abnormally porous region. The structural defect may also be a presence of an inclusion of an undesirable material, or of a corroded region. The structural defect may affect the surface of the part 10 located facing the sensor. It may also be located at depth in the part. The type of sensor used is selected depending on the defect to be characterized.

The part 10 to be tested may be formed from a composite. It then comprises components assembled with one another. It may be a question of an assembly of plates or of fibers. The structural defect may be an assembly defect: it may be a question of local delamination of plates, or of a decohesion of fibers or of fiber strands, or of a non-uniformity in the orientation of fibers, or a defect resulting from an impact or shock.

The characterization of the defect aims to determine the type of defect affecting the part, among the aforementioned types. It may also comprise location of the defect, and estimation of all or some of its dimensions.

The part 10 to be tested has mechanical properties that are spatially distributed along the part. The characterization of the part may comprise comparing a distribution of mechanical properties to a reference spatial distribution. It may for example be a question of identifying a portion of the part in which the mechanical properties do not correspond to reference mechanical properties. The mechanical property may be Young's modulus, or density, or a propagation speed of a bending wave. The reference spatial distribution may be obtained from a specification, and correspond to an objective to be achieved. It may result from a model or from experimental measurements performed on a model part.

The preceding paragraph also applies to electrical or magnetic properties, or even to a stress to which the part to be tested is exposed. It may for example be a question of a temperature-related stress or of a pressure-related stress to which the part is subjected during its operation. Thus, the characterization of the part may consist in establishing a temperature of the part, or a level of mechanical stress (force, pressure, deformation) to which the part is subjected. The characterization may also consist in establishing a spatial distribution of a temperature of the part or, more generally, of a stress to which the part is subjected.

The measurements may be processed using a supervised artificial-intelligence algorithm, for example one based on a neural network. The algorithm may be trained by constructing a database formed from measurements carried out or simulated on a part the features of which are known: shape, dimensions, constitution, temperature, potentially presence of a defect and any other physical quantity allowing the defect if any to be characterized.

The database may be established by simulation, using a dedicated simulation software package. An example of a dedicated software package is the software package CIVA (supplier: Extende), which notably allows various non-destructive-testing techniques to be simulated: propagation of ultrasound, effects of eddy currents and X-ray radiography. Such a software package allows measurements to be simulated based on modeling of the part. Use of such a software package may allow a database to be constructed allowing the artificial-intelligence algorithm used to be trained.

First Embodiment

Figures 2A, 2B:
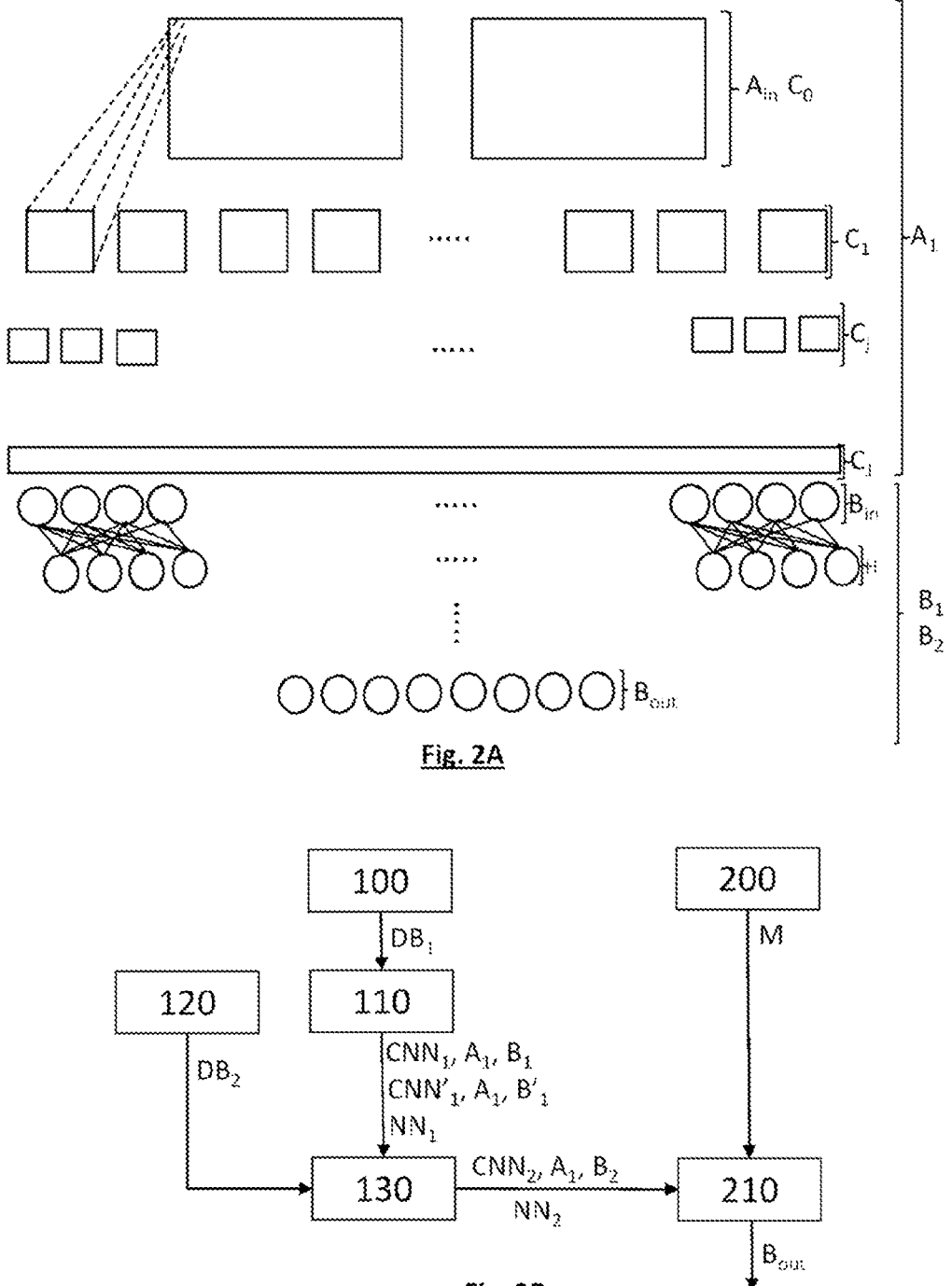
FIG. 2A shows the structure of a convolutional neural network implemented in a first embodiment.
FIG. 2B shows the main steps of a method according to the invention.

According to a first embodiment, the supervised artificial-intelligence algorithm is based on a convolutional neural network. Such a neural network is suitable for applications in which the input data are in matrix format and can be likened to images. Each image corresponds to a map of a measured physical quantity liable to vary in the presence of a defect in the part. FIG. 2A schematically shows the architecture of such a network.

The convolutional neural network comprises a feature-extracting block $A_1$, connected to a processing block $B_1$. The processing block is configured to process the features extracted by the extracting block $A_1$. In this example, the processing block $B_1$ is a classifying block. It allows a classification on the basis of the features extracted by the extracting block $A_1$. The convolutional neural network is fed with input data $A_{in}$, which correspond to one or more images. In the example in question, the input data form an image obtained through concatenation of two images representing the real part and the imaginary part, respectively, of the impedance variation $\Delta H$ measured at various measuring points regularly distributed, facing the part, in a matrix-array arrangement.

The feature-extracting block $A_1$ comprises J layers $C_1 \ldots C_j \ldots C_J$ downstream of the input data. J being an integer higher than or equal to 1. Each layer $C_j$ is obtained by applying a convolution filter to the images of a previous layer $C_{j-1}$. The index j is the rank of each layer. The layer $C_0$ corresponds to the input data $A_{in}$. The parameters of the convolution filters applied in each layer are determined during training. The last layer $C_J$ may comprise a number of terms exceeding several tens, or even several hundreds, or even several thousands. These terms correspond to features extracted from each image forming the input data.

Between two successive layers, the method may comprise dimension-reducing operations (pooling operations for example). It is a question of replacing the values of a group of pixels with a single value—for example the mean, or the maximum value, or the minimum value of the group in question. Max pooling, which corresponds to the replacement of the values of each group of pixels with the maximum value of the pixels in the group, may for example be applied. The last layer $C_J$ is flattened, to make the values of this layer form a vector. These values constitute the features extracted from each image.

The classifying block $B_1$ is a fully connected neural network, or multilayer perceptron. It comprises an input layer $B_{in}$, and an output layer $B_{out}$. The input layer $B_{in}$ is formed by the features of the vector resulting from the extracting block $A_1$. Between the input layer $B_{in}$ and the output layer $B_{out}$, one or more layers H may be provided. The input layer $B_{in}$, each layer H and the output layer $B_{out}$ are thus placed in succession.

Each layer may be assigned a rank k. The rank k=1 corresponds to the input layer $B_{in}$. Each layer comprises nodes, referred to as fully connected nodes, the number of fully connected nodes of a layer possibly being different from the number of fully connected nodes of another layer. Generally, when k≥2, the value of a node $y_{n,k}$ of a layer of rank k is such that $$y_{n,k} = f_n\left(\sum_m (w_{m,n} y_{m,k-1} + b_m)\right)$$

where $y_{m,k-1}$ is the value of a node of the previous layer k−1, m being an order of the node of the previous layer, m being an integer comprised between 1 and $M_{k-1}$, $M_{k-1}$ corresponding to the dimension of the previous layer, of rank k−1;

$b_m$ is a bias associated with each node $y_{m,k-1}$ of the previous layer;

$f_n$ is an activation function associated with the node of order n of the layer in question, n being an integer comprised between 1 and $N_k$, $N_k$ corresponding to the dimension of the layer of rank k;

$w_{m,n}$ is a weighting term for the node of rank m of the previous layer (rank k−1) and the node of rank n of layer in question (rank k).

The form of each activation function $f_n$ is determined by a person skilled in the art. It may for example be a question of an activation function $f_n$ of hyperbolic-tangent or sigmoid type.

The output layer $B_{out}$ contains values allowing a defect identified by the images of the input layer $A_{in}$ to be characterized. It is the result of the inversion performed by the algorithm.

In the simplest application, the output layer may comprise only a single node, taking the value 0 or 1 depending on whether the analysis reveals the presence or absence of a defect.

In an application to identification, the output layer $B_{out}$ may comprise as many nodes as there are types of defect to be identified, each node corresponding to a probability of presence of one type of defect among predetermined types (crack, hole, delamination, etc.).

In an application to determining dimensions, the output layer may comprise as many nodes as there are dimensions of a defect, this assuming employment of a defect geometric model.

In an application to determining location, the output layer may comprise coordinates indicating the, two-dimensional or three-dimensional, position of a defect in the part.

In an application to characterization, the output layer may contain information on the inspected part, for example a spatial distribution of mechanical properties (Young's modulus for example), or electrical or magnetic or thermal properties (temperature for example) or geometric properties (a dimension of the part for example). The dimension of the output layer corresponds to a number of points of the part at which the mechanical property is estimated on the basis of the input data.

The applications may be combined, so as to obtain both a location and dimensions, or a location, an identification and dimensions.

An important element of the invention is that, for a given application, the extracting block $A_1$ may be established using the thoroughest possible training operation, employing a first database $DB_1$. The first database is as exhaustive as possible. It is preferably obtained under laboratory experimental conditions and/or or by simulation, taking into account a first part, which may be a modeled part or a real part. This allows a high number of measured or modeled values to be used to form the input layer $A_{in}$. It will be understood that in the first training operation, just as in a second training operation described below, the output layer $B_{out}$ is known.

The first training phase allows the extracting block $A_1$ and a first classifying block $B_1$ to be parametrized. The objective of the first training phase is to obtain an extracting block $A_1$ that performs well in terms of extraction of relevant information from the input data.

The first database $DB_1$ may contain a first number of images $N_1$ that may exceed several hundred or even several thousand or millions. Thus, following the first training operation, the neural network $CNN_1$, formed by combination of blocks $A_1$ and $B_1$, is assumed to have a satisfactory prediction performance.

An important element of the invention is to be able to use one portion of the first neural network to perform the second training operation. In the second training operation, measurements carried out experimentally on a second part, which corresponds to the part to be characterized, are used as input data. Thus, the second training operation is carried out using a second database $DB_2$, established using experimental measurements performed on the part to be characterized, and on the basis of which the second training operation is performed.

One important aspect of the invention is that, in the second training operation, the extracting block $A_1$ resulting from the first training operation is preserved. The first training operation is considered to be sufficiently exhaustive for the performance of the extracting block, in terms of extraction of features of the images supplied as input, to be considered sufficient. The extracting block may thus be used in the second training operation. In other words, the features extracted by the block $A_1$ are considered to be a good descriptor of the measurements forming the input layer.

The second training operation is thus limited to an update of the parametrization of the classifying block, to obtain a second classifying block $B_2$ tailored to the characterized part. The second training operation may thus be implemented with a second database $DB_2$ taking into account uncertainties or variability resulting from the performance of experimental measurements on the part to be characterized. It is a question of taking into account the variability that usually affects the in-situ measurements carried out on the part to be characterized, and that are difficult to model, this variability including:

variability affecting the sensor: sensor noise, measurement uncertainties, fluctuations in the position of the sensor with respect to the part, environmental parameters that may affect the measurements (for example temperature or humidity, and possibly pressure);

variability affecting the part to be characterized: actual composition of the part, surface finish of the part, shape of the part, any manufacturing defects.

In the course of the second training operation, the second classifying block $B_2$ may be initialized taking into account the parameters governing the first classifying block $B_1$. According to one possibility, the second classifying block $B_2$ may comprise the same number of layers as the first classifying block $B_1$. These layers may possess the same number of nodes as the layers of the first classifying block. The dimension of the output layer depends on the features of the defect to be estimated. Thus, the dimension of the output layer of the second classifying block $B_2$ may be different from the dimension of the first classifying block $B_1$. According to one possibility, the number of layers and/or the dimension of the layers of the second classifying block is different from the number of layers and/or the dimension of the layers of the first classifying block.

Irrespectively of the embodiment, the method allows a first training operation to be implemented under laboratory conditions, on the basis of simulations or of optimized experimental conditions. This first training operation is followed by a second training operation that is closer to the in-the-field reality: experimental measurements performed directly on the characterized part and more realistic measurement conditions are taken into account. The invention makes it possible to limit the number of measurements necessary for the second training operation, while allowing a neural network that has a good prediction performance to be obtained: the second training operation may thus be based on a limited number of experimental measurements. Frugal learning is spoken of. This is an important advantage, since acquiring measurements under realistic conditions is usually more complex than obtaining measurements in the laboratory or simulated measurements. The second training operation may allow specificities that are difficult to model to be taken into account, for example measurement noise, or variations in the actual composition or in the actual shape of the part.

The first training operation may be thought of as a general training operation, suitable for various particular applications, or for parts of various types or shapes, or for various types of defects. It is essentially intended to provide an extracting block $A_1$ allowing relevant features to be extracted from input data. The second training operation is a more targeted training operation, tailored to the part to be characterized. The invention makes it easier to perform the second training operation, because it requires markedly less input data than the first training operation. Thus, the same first training operation may be used to perform various second training operations, corresponding to different configurations, respectively.

The first training operation is carried out on a database allowing various conditions to be taken into account: for example various types or dimensions of a defect, various positions of a defect, various compositions or shapes of parts, various positions of the sensor with respect to the part. This makes it possible to provide a more exhaustive first database, for example reflecting a high degree of variability:

in the dimensions and/or in the shape of the defect or part in the constitution of the part (various types of materials may be successively considered).

In the second training operation, the part in question is the part to be analyzed. The second training operation may notably be performed while the part to be analyzed is considered to be healthy, i.e. defect-free. The second training operation then makes it possible to characterize the healthy state while taking into account the experimental variabilities described above. The second training operation may be carried out by placing a network of sensors on the part to be characterized, in order to monitor its state of health. The sensor network then forms a network suitable for monitoring the part regularly, according to the principles of SHM described with regard to the prior art. The second training operation is performed on the basis of regular measurements on the part. This results in measurements considered representative of the healthy state of the part. At the end of the training period, the second neural network is used to monitor a variation in the state of the part, during use thereof, so as to detect an appearance of a defect or a change in the features of the part (for example in the mechanical, thermal and/or dimensional characteristics thereof). This ability makes it possible for the second training operation to be tailored particularly well to the characterized part, since the latter is used to carry out the second training operation.

The second training operation may be carried out using measurements performed, on the analyzed part, under various environmental conditions (temperature, humidity), so as to obtain a second neural network that is robust with regard to variation in environmental conditions.

One example of application is use of a network of sensors placed in situ to monitor a structural element of an airplane, for example a fuselage or a wing. The sensors are initially used to perform the second training operation. Following the second training operation, the sensors are employed periodically to monitor the structure, the measurements being interpreted by the second neural network. It may for example be a question of mechanical sensors, detecting propagation of a bending wave propagating along the part to be analyzed.

The main steps of the first embodiment are schematically shown in FIG. 2B.

Step 100: creating the first database $DB_1$.

In the course of this step, the first database $DB_1$ is built in a first configuration. The first database may notably be formed from images representative of measurements obtained (performed or simulated) under laboratory conditions.

Step 110: first training operation.

In the course of this step, the first database is used to parametrize the blocks $A_1$ and $B_1$, so as to optimize the prediction performance of a first convolutional neural network $CNN_1$.

Step 120: creating the second database $DB_2$.

In the course of this step, the second database $DB_2$ is built using experimental measurements of the part to be characterized. The size of the second database is preferably smaller than the size of the first database.

Step 130: second training operation.

In the course of this step, the second database $DB_2$ is used to train a second convolutional neural network $CNN_2$ formed by the first extracting block $A_1$, resulting from the first training operation, and by a second classifying block $B_2$ fashioned to the experimental conditions of the second training operation.

The convolutional neural network $CNN_2$ resulting from the second training operation is intended to be employed to interpret measurements performed on the part used. This is the object of the following step.

Step 200: carrying out measurements.

Measurements are carried out, on the examined part, in the measurement configuration considered in the second training operation.

Step 210: interpreting the measurements.

The convolutional neural network $CNN_2$, resulting from the second training operation, is used to characterize the examined part, based on the measurements performed in step 200. These features may be established using the output layer $B_{out}$ of the convolutional neural network $CNN_2$. This network is therefore used to perform the step of inverting the measurements.

Example of the First Embodiment

Figure 3A:
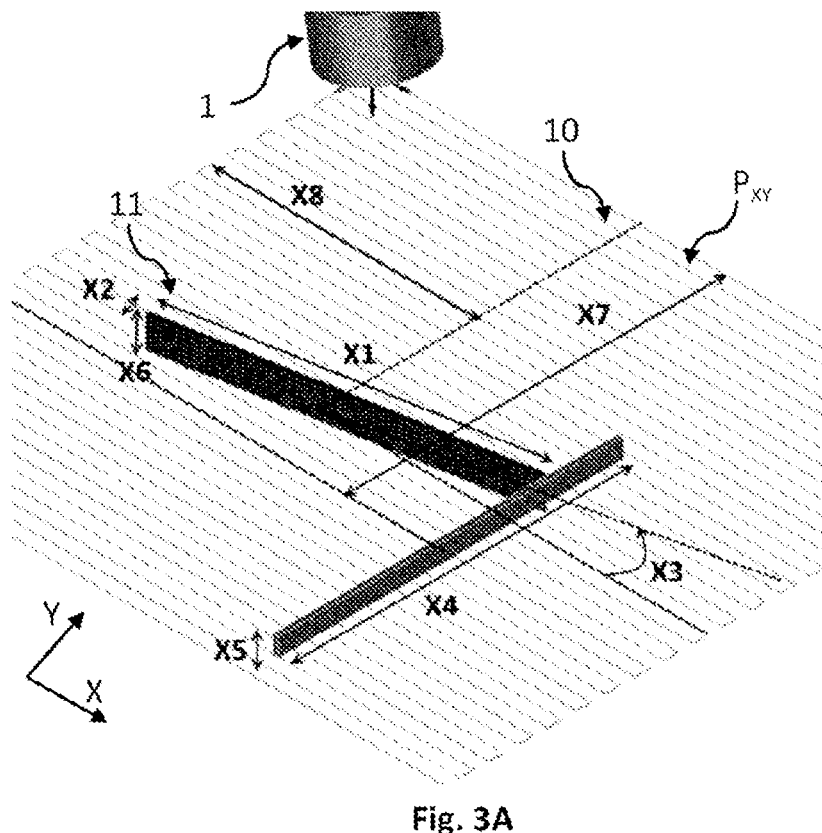
FIG. 3A shows a defect considered in a first example.

A first example of implementation of the invention will now be presented with reference to FIGS. 3A to 3D. FIG. 3A shows a simple defect, a T-shaped crack, having 7 positional or dimensional features:

the features X1, X2 and X4 are lengths or widths of two branches in a plane $P_{XY}$;

the features X5 and X6 are depths of the two branches perpendicular to the plane $P_{XY}$;

the feature X3 is an angular feature;

the features X7 and X8 are features in respect of the position of the defect in the plane $P_{XY}$.

Figure 3B:
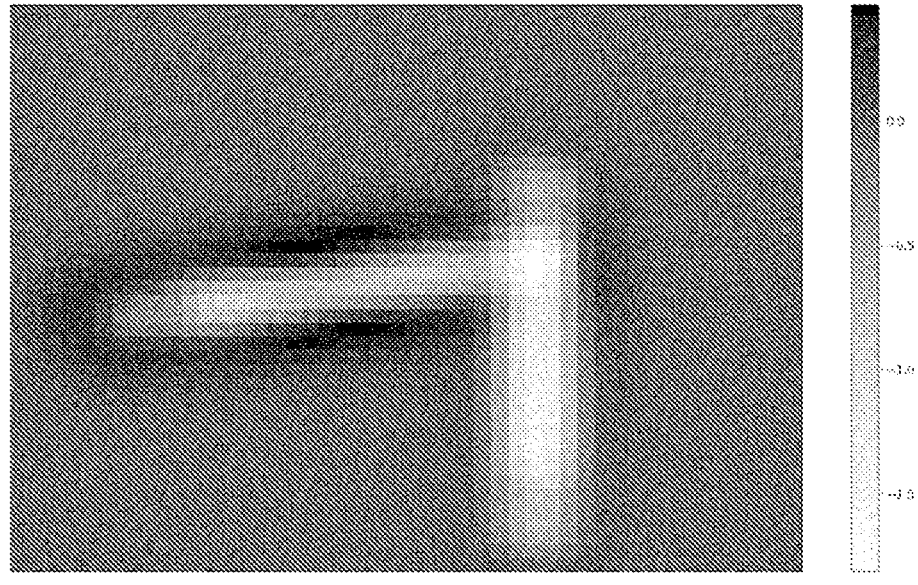
FIG. 3B is an example of an image resulting from simulated measurements of the defect shown in FIG. 3A.

Measurements performed using an eddy-current technique, in a scan consisting of 41×46 measurement points, at a distance of 0.3 mm above the part, were simulated. The part was a planar metal part. The light-gray line shown in FIG. 3A illustrates the movement of the sensor along the part, parallel to the plane $P_{XY}$. The image shown in FIG. 3B is an image of the real part of the impedance variation $\Delta H$. The impedance variation corresponds to a difference, at each measurement point, between simulated impedances in the presence and absence of a structural defect in the part, respectively. FIG. 3B was obtained considering the following features: X1=11.822 mm; X2=0.086 mm; X3=−9.88°; X4=11.835 mm; X5=0.635 mm; X6=1.127 mm; X7=27.489 mm; X8=24.099 mm.

A first training operation was carried out on the basis of simulations. In the course of the first training operation, 2000 measurements were used taking into account a very low noise level (signal-to-noise ratio of 40 dB). The simulations form a first database $DB_1$ affected by a small amount of noise, this mimicking laboratory data, whether simulated or measured data. Each input image was a concatenation of an image of the real part and of an image of the imaginary part of the impedance variation $\Delta H$ measured at each measurement point. In the course of this training operation, the dimensions of the structural defect were varied, its shape remaining the same.

The first training operation allowed a first convolutional neural network $CNN_1$, comprising a first extracting block $A_1$ and a first classifying block $B_1$ such as described above, to be parametrized. The input layer comprised two images, corresponding to the real part and to the imaginary part of the impedance variation $\Delta H$ at the various measurement points, respectively. The extracting block $A_1$ comprised four convolution layers $C_1$ to $C_4$ such that:

$C_1$ was obtained by applying 32 convolution kernels of 5×5 size to the two input images.

$C_2$ was obtained by applying 32 convolution kernels of 3×3 size to the layer $C_1$.

$C_3$ was obtained by applying 64 convolution kernels of 3×3 size to the layer $C_2$.

A maxpooling operation into groups of 2×2 pixels was performed between layers $C_2$ and $C_3$ and between layer $C_3$ and layer $C_4$, the latter being converted into a vector of 1024 size.

The vector of 1024 size obtained from the extracting block $A_1$ formed the input layer $B_{in}$ of a classifying block fully connected $B_1$ comprising a single hidden layer H (512 nodes), which was connected to an output layer $B_{out}$. The latter was a vector that was 8 in size, each term corresponding to one estimate of the dimensions X1 to X8, respectively.

The first convolutional neural network $CNN_1$ was tested to estimate the 8 dimensional parameters X1 to X8 shown in FIG. 3A. In the test, simulated test images that were representative of experimental measurements having three signal-to-noise ratios, 5 dB (low signal-to-noise ratio), 20 dB (average signal-to-noise ratio), and 40 dB (high signal-to-noise ratio), respectively, were used. It was a question of simulating signal-to-noise ratios that might be encountered when taking experimental measurements, on a real part. In the test images, the various features X1 to X8 were varied. Signal-to-noise ratio was simulated by adding white Gaussian noise to the images forming the input layer of the neural network.

Figure 3C:
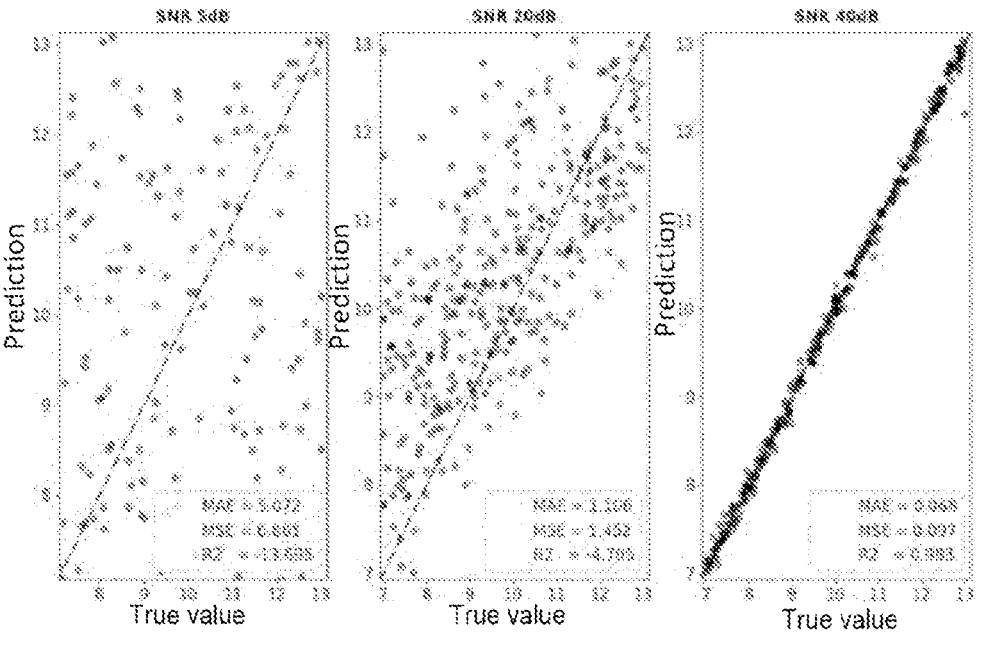
FIG. 3C shows the prediction performance of a neural network, respectively considering measurements the signal-to-noise ratio of which is 5 dB (left), 20 dB (center), and 40 dB (right), respectively.

FIG. 3C shows the prediction performance in respect of the dimension X1 when test images the signal-to-noise ratio (SNR) of which was equal to 5 dB (left), 20 dB (center), 40 dB (right), respectively, were used. In each of the curves, the x-axis corresponds to the true values and the y-axis corresponds to the values estimated by the neural network $CNN_1$. It may be seen that prediction performance is unsatisfactory when the signal-to-noise ratio does not correspond to the signal-to-noise ratio considered in the training operation. In contrast, estimation performance is satisfactory when the signal-to-noise ratio corresponds to the signal-to-noise ratio considered in the training operation (40 dB). In each figure, prediction performance has been quantified by the indicators MAE (Mean Absolute Error) and MSE (Mean Squared Error) and by a correlation coefficient R2.

The inventors trained a second neural network $CNN_2$, using, in a second database, 20 images simulated taking into account a signal-to-noise ratio of 40 dB and images simulated taking into account a signal-to-noise ratio of 5 dB, i.e. a total of 40 images. As described above, the second neural network $CNN_2$ was parametrized while keeping the extracting block $A_1$ of the first neural network $CNN_1$. Only the classifying block $B_2$ of the second neural network was parametrized, while keeping the same number of layers and the same number of nodes per layer as the first neural network $CNN_1$.

Figure 3D:
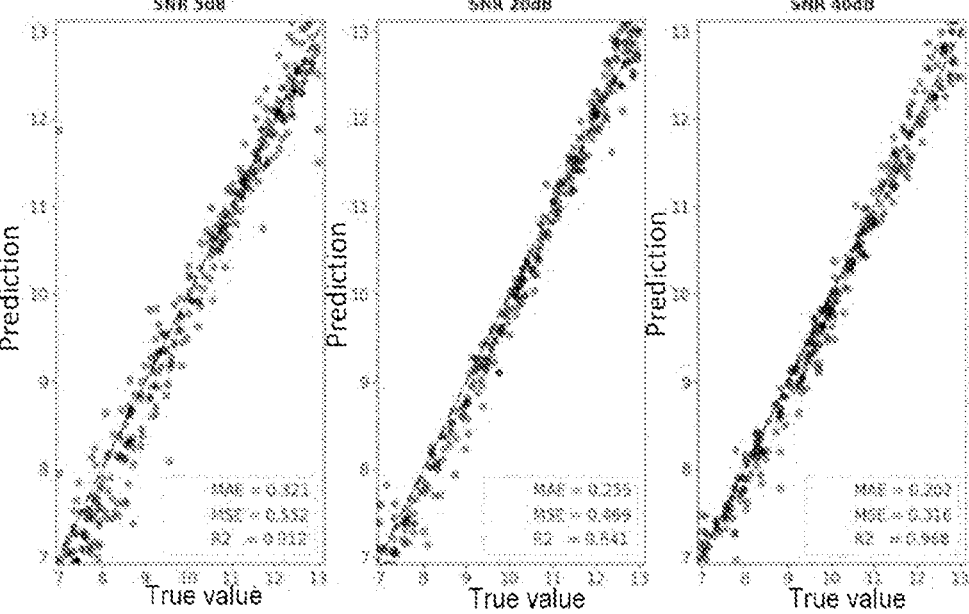
FIG. 3D shows the prediction performance of a neural network according to the invention, respectively considering measurements the signal-to-noise ratio of which is dB (left), 20 dB (center), and 40 dB (right), respectively.

The second neural network $CNN_2$ was tested on the same test data as the first neural network, i.e. with test images having signal-to-noise ratios equal to 5 dB, 20 dB and 40 dB, respectively. FIG. 3D shows the estimation performance of the second neural network, relative to the estimation of the first dimension X1. The format of FIG. 3D is identical to that of FIG. 3C: test images the signal-to-noise ratio of which was 5 dB (left), 20 dB (center) and 40 dB (right). The prediction performance is good whatever the signal-to-noise ratio in question.

This first example demonstrates the relevance of the invention: it allows a neural network to adapt rapidly when a second configuration is passed to from a first configuration by modifying conditions under which the first training operation was performed, in the present case the signal-to-noise ratio. It will be noted that the second neural network was parametrized using a database of 40 images, i.e. 50 times fewer than the database used during training of the first neural network.

Second embodiment.

According to a second embodiment, in the first training operation, a first extracting block $A_1$ coupled to a reconstructing block $B'_1$ is employed. Just like the first classifying block $B_1$ described above, the reconstructing block $B'_1$ is a block for processing the data extracted by the first extracting block $A_1$. In this variant a first neural network $CNN'_1$ is an autoencoder. As shown in FIG. 4, the first neural network comprises the extracting block $A_1$ and the reconstructing block $B'_1$.

In a manner known to those skilled in the art, an autoencoder is a structure comprising an extracting block $A_1$ (called the encoder) that allows relevant information to be extracted from an input datum $A_{in}$, defined in an input space. The input datum is thus projected into a space, called the latent space. In the latent space, the information extracted by the extracting block is called code. The autoencoder comprises a reconstructing block $B'_1$, allowing the code to be reconstructed, so as to obtain an output datum $A_{out}$, defined in a space that is generally identical to the input space. Training is performed in such a way as to minimize an error between the input datum $A_{in}$ and the output datum $A_{out}$. Following training, the code, extracted by the extracting block, is considered to be representative of the main features of the input datum. In other words, the extracting block $A_1$ allows the information contained in the input datum $A_{in}$ to be compressed.

The first neural network may notably be a convolutional autoencoder: each layer of the extracting block $A_1$ results from application of a convolution kernel to a previous layer. FIG. 4 shows the convolution layers $C_1 \ldots C_j \ldots C_J$, layer $C_J$ being the last layer of the extracting block $A_1$, comprising the code. FIG. 5 also shows the layers $D_1 \ldots D_j \ldots D_J$ of the reconstructing block $B'_1$, layer $D_J$ corresponding to the output datum $A_{out}$.

Unlike the classifying block $B_1$ described above, the reconstructing block $B'_1$ is not intended to determine the features of the part. The reconstructing block allows the output datum $A_{out}$ to be reconstructed, based on the code (layer $C_J$), the reconstruction being as faithful as possible to the input datum $A_{in}$. The classifying block $B_1$ and the reconstructing block $B'_1$ are used for the same purpose: to allow parametrization of the first extracting block $A_1$, the latter being able to be used during the second training operation, to parametrize the second classifying block $B_2$.

In this variant, the method follows steps 100 to 210 described above with reference to FIG. 2B. The first training operation (step 110) consists in parametrizing the extracting block $A_1$. It may be performed on the basis of at least a first database.

Use of an autoencoder allows various first databases to be combined. Certain databases are representative of healthy defect-free parts, whereas other databases are representative of parts with a defect. For example, it is possible to combine:

databases collating measurements performed on a healthy part, at various temperatures, with a view to learning the effect of a temperature variation on the measurements;

databases collating measurements performed on a part comprising a defect, at a constant temperature, with a view to learning the effect of the presence of a defect on the measurements.

Combining various databases, representative of different situations, to perform a first training operation allows a data-extracting block to be obtained that concentrates the useful information of each image.

Following training, steps 120 to 210 are performed as described above. It is a question of performing a second training operation, on the basis of the second database of experimentally acquired data, so as to parametrize the classifying block $B_2$, using the extracting block $A_1$ resulting from the first training operation.

Third Embodiment

According to a third embodiment, the first and second neural networks are "fully connected" networks or multilayer perceptrons, as shown in FIG. 5. Unlike the first and second embodiments, a convolutional neural network is not employed.

The first and second neural networks comprise an input layer $L_{in}$, or first layer, formed by measured or simulated data. They comprise an output layer $L_{out}$, which delivers the classification information obtained through the neural network.

The structure of the first and the second neural networks is similar to the structure of the classifying blocks $B_1$, $B_2$ described in connection with the first embodiment. Each neural network may comprise layers $L_k$, of rank k. The rank k=1 corresponds to the input layer $L_{in}$. Each layer comprises nodes, referred to as fully connected nodes, the number of fully connected nodes of a layer possibly being different from the number of fully connected nodes of another layer. As described above, when k 2, the value of a node $y_{n,k}$ of a layer of rank k is such that $$y_{n,k} = f_n\left(\sum_m (w_{m,n} y_{m,k-1} + b_m)\right)$$

where $y_{m,k-1}$ is the value of a node of the previous layer k−1, m being an order of the node of the previous layer, m being an integer comprised between 1 and $M_{k-1}$, $M_{k-1}$ corresponding to the dimension of the previous layer, of rank k−1;

$b_m$ is a bias associated with each node $y_{m,k-1}$ of the previous layer;

$f_n$ is an activation function associated with the node of order n of the layer in question, n being an integer comprised between 1 and $N_k$, $N_k$ corresponding to the dimension of the layer of rank k;

$w_{m,n}$ is a weighting term for the node of rank m of the previous layer (rank k−1) and the node of rank n of layer in question (rank k).

The output layer $L_{out}$ contains values allowing the part to be characterized based on the, experimental or simulated, measurements forming the input layer. It is the result of the inversion performed by the algorithm.

According to this embodiment, a first training operation is performed so as to parametrize a first fully connected neural network $NN_1$. As described in connection with the first and second embodiments, the first fully connected neural network may be parametrized based on input data representative of laboratory conditions, irrespectively of whether these data result from experimental measurements or from simulations. A second fully connected neural network $NN_2$ is then parametrized, using more realistic input data, obtained experimentally, on the part to be characterized. The second fully connected neural network $NN_2$ is parametrized using, at least partially, the parameters defining the first fully connected neural network $NN_1$.

Thus, at least one layer $L_k$ ($k \geq 1$) of the second neural network $NN_2$ is parametrized using the parametrization of the first neural network $NN_1$. In the second training operation, the second neural network may for example be initialized using the first neural network. In addition, or alternatively, at least one node of a layer, or even each node of a layer, of the second neural network may keep the bias or gain values assigned to a node of a layer of same rank in the first neural network.

Example of the Third Embodiment

FIGS. 6A to 6G illustrate an example of implementation of this embodiment. FIG. 6A shows a plate 10 to be characterized. The plate 10 is equipped with piezoelectric transducers 21 configured to emit or detect a bending wave propagating through the plate. Characterization of the plate consists in measuring propagation parameters of a travelling wave 22, propagating between two different transducers: one transducer acts as emitter, whereas the other transducer acts as detector. The propagation parameters of the wave (in particular group velocity and/or amplitude) depend on the elastic properties of the part, and notably on its density and its Young's modulus. The density and Young's modulus of the part depend on its temperature. Thus, the propagation parameters of the bending wave allow the temperature of the part to be estimated. When various piezoelectric transducers are placed at points around one portion of the part, a plurality of emitter/detector pairs may be defined. It is then possible to estimate a temperature spatial distribution in the portion of the part bounded by the transducers, using reconstruction algorithms known to those skilled in the art. The higher the number of transducers, the better the spatial resolution of the temperature distribution.

Using this type of measurement allows appearance of temperature non-uniformities referred to as "hot spots" to be detected during use of the part, when the latter is subjected to stresses. The part may for example be a structural component of an aircraft, for example one portion of a fuselage or of a wing.

FIG. 6B shows a simulation of a traveling wave 22 detected by a transducer, considering two temperatures: 6° C. and 13° C. The x-axis represents time, the origin corresponding to the time of emission of the wave by an emitting transducer. The y-axis corresponds to the amplitude of the wave. The envelope 23, allowing the group velocity of the wave 22 to be estimated, has been shown. In FIG. 6B, the curves modeled for the two temperatures superpose. FIG. 6C, which resulted from a simulation, shows a detail of the envelope 23 (framed portion in FIG. 6B), for the two temperatures in question. FIG. 6D shows results of experimental measurements, at the same temperatures. The simulations and measurements were performed on a 3 mm thick, parallelepipedal aluminum part of square cross section having a side length of 60 cm. The eight piezoelectric transducers were arranged in a circle of 30 cm diameter. The temperature of the part was assumed to be uniform.

In a first training operation, a neural network $NN_1$, namely a multilayer perceptron, was parametrized. The input datum was obtained by sampling a time-domain measurement of the amplitude of the wave 22 detected by a transducer 21, and comprised 700 samples acquired at a sampling frequency of 1 MHz. The output datum was a temperature of the part. Eight transducers distributed as described above were employed, forming 56 emitter/detector pairs. In this example, measurements were performed using eight radially opposite emitter/detector pairs. A first database was formed, this database containing waves simulated considering various emitter/detector pairs, and a temperature varying between 6° and 20°.

The first database $DB_1$ was used to parametrize the first neural network $NN_1$, which comprised two hidden layers formed from 32 and 16 nodes, respectively. The output layer had one node, corresponding to an estimate of the value of the temperature of the part.

The first neural network $NN_1$ was tested, using simulated data not used for training. FIG. 6E shows the temperature estimated by the first neural network (y-axis) as a function of the temperature taken into account to perform the simulation (x-axis). The temperature range extended between −15° C. and 25° C. The correlation coefficient $R^2$ was equal to 0.99994, i.e. close to 1.

A second database $DB_2$ was established, based on experimental measurements acquired on an aluminum part instrumented with eight piezoelectric transducers describing a circle of 30 cm. Such a configuration corresponded to the configuration simulated to form the first database $DB_1$. In the course of experimental trials, temperature varied between 5° C. and 17° C. FIG. 6F shows a normalized histogram of the temperatures taken into account when constructing the second database $DB_2$.

Using the second database, a second neural network $NN_2$ was parametrized, the structure of which neural network was identical to that of the first neural network. The second neural network $NN_2$ was initialized considering the parameters of the first neural network $NN_1$. The second neural network was adapted, depending on the experimental measurements performed on the part. To perform the training, 50 different input data were taken into account. The second neural network was tested using test data (i.e. data not used for training) corresponding to measurements made when the temperature of the part was known.

The second database was used to parameterize a so-called basic neural network that was similar in structure to the first and second neural networks (same number of layers, same number of nodes per layer and input layer of same dimension).

The basic neural network was parametrized ex nihilo, i.e. without using the parametrization of the first neural network.

FIG. 6G shows the temperatures estimated by the second neural network (y-axis—cross-shaped marks) and by the basic neural network (y-axis—dot-shaped marks) as a function of the temperature of the part (x-axis). The temperature range was between 5° C. and 17° C.

Using the second neural network, the correlation coefficient $R^2$ was equal to 0.686, which should be judged in light of the fact that little training data was available in the temperature range 12° C.-17° C. (see FIG. 6F). Using the basic neural network, the correlation coefficient $R^2$ was equal to 0.073, due to the small size of the second database. The difference in the correlation coefficients obtained using the same database, with implementation of the invention, i.e. starting with the first neural network, and without implementation of the invention, will be noted. This attests to the relevance of the invention, since it is possible to rapidly obtain a high-performance second neural network, even with a small number of training data.

Whatever the embodiment, using a given first neural network, it is possible to parametrize as many second neural networks as there are parts to be characterized. Thus, using a given first neural network, it is possible to parametrize two different neural networks, suitable for different parts, which may for example correspond to two different portions of an airplane (fuselage and wing).

The invention is applicable to other techniques usually employed in the field of non-destructive testing. More precisely, other envisionable techniques are:

Ultrasonic testing, in which an acoustic wave propagates through an examined part. This encompasses echography, in which the measurements are generally representative of reflection, by a structural defect, of an incident ultrasonic wave. This also encompasses propagation of guided ultrasonic waves. In this type of technique, the physical quantities addressed are the properties of propagation of ultrasonic waves through the material, the presence of a defect resulting in a variation in the properties of propagation with respect to a part in the absence of a defect. It is possible to obtain images representative of the propagation of an ultrasonic wave along or through a part.

X-ray or gamma-ray testing, in which the examined part is irradiated with ionizing electromagnetic radiation. The presence of a structural defect results in a modification of the transmission properties of the radiation. The measurements allows images representative of the transmission of the radiation through the examined part to be obtained.

Thermographic testing, in which the examined part is illuminated with a light wave, for example in the infrared spectral band. The presence of a defect results in a modification of the reflection properties of the light wave. The measurements allow images representative of the reflection of the light wave by the examined part to be obtained.

The invention will potentially be used to characterize structural elements requiring regular monitoring over time, a structural element of an aircraft for example. It allows in situ sensors installed on the part to be used, said sensors being able to be used during training.

The invention claimed is:

1. A method for characterizing a part, comprising:

a) carrying out non-destructive measurements using a sensor, the sensor being placed on the part or facing the part, the sensor being configured to measure a physical quantity allowing a mechanical or thermal characterization of the part;

b) using the measurements as input data of a characterization neural network, the characterization neural network comprising an input layer, established using the input data, and an output layer, comprising at least one node;

c) depending on the value of the node or of each node of the output layer of the characterization neural network, characterizing the part;

the method comprising, prior to b) and c):

constructing a first database, the first database containing measurements of the physical quantity, said measurements being performed or simulated, on a first model part;

parametrizing a first neural network, the first neural network being parametrized by parameters defined during a first training operation, using the first database;

wherein the method further comprises:

constructing a second database (DB$_2$), containing experimental measurements of the physical quantity performed on the part to be characterized;

a second training operation, using the second database, so as to parametrize a second neural network, the second training operation using parameters of the first neural network defined in the first training operation;

such that in b), the characterization neural network used is the second neural network, resulting from the second training operation.

2. The method of claim 1, wherein:

the first neural network comprises an input layer and an output layer, and optionally an intermediate layer, between the input layer and the output layer;

the second training operation comprises adapting the output layer and/or the optional intermediate layer of the first neural network, so as to form a layer of the second neural network.

3. The method of claim 1, wherein:

the first neural network is a convolutional neural network, comprising an extracting block and a processing block, the first neural network being such that:

the extracting block is configured to extract features from the input data of the first neural network, the input data resulting from the first database;

the processing block is configured to process features extracted by the extracting block;

the second neural network is a convolutional neural network, comprising:

the extracting block of the first neural network;

and a classifying block, the classifying block being configured to perform a classification of the features extracted by the extracting block, the classifying block outputting to the output layer of the second neural network.

4. The method of claim 3, wherein the processing block of the first neural network is a classifying block, configured, in the first training operation, to perform a classification of the features extracted by the extracting block.

5. The method of claim 4, wherein the first neural network is an autoencoder, the processing block of the first neural network being configured, in the first training operation, to reconstruct data obtained from the first database, and forming input data of the first neural network.

6. The method of claim 1, wherein the first and second neural networks are multilayer perceptrons.

7. The method of claim 1, wherein the first neural network is used to initialize the training of all or some of the second neural network.

8. The method of claim 1, wherein, in the second training operation and in the course of at least one step a), or even each step a), subsequent to the second training operation, the sensor may be placed in situ, installed on the part.

9. The method of claim 1, wherein:

the part is liable to comprise a defect;

step c) comprises detecting the presence of a defect in the part, and optionally characterizing the detected defect.

10. The method of claim 9, wherein the characterization of the part comprises:

identification of the type of defect, among predetermined types;

and/or estimation of at least one dimension of the defect; and/or location of the defect in the part;

and/or determination of a number of defects in the part.

11. The method of claim 9, wherein the first database comprises measurements performed or simulated on a model part comprising the defect.

12. The method of claim 9, wherein the defect is at least one of: delamination, and/or crack, and/or perforation and/or crack propagating from a perforation and/or presence of a porous region and/or presence of an inclusion and/or presence of corrosion.

13. The method of claim 9, wherein the part is made of a composite, comprising components assembled with one another, and wherein the defect is an assembly defect between the components.

14. The method of claim 1, wherein the measurements are representative of a spatial distribution of at least one of:

electrical or magnetic or mechanical properties of the part;

a property of propagation of an acoustic or mechanical or electromagnetic wave through or along the part;

a property of reflection of an acoustic or mechanical or visible or infrared electromagnetic wave by the part.

15. The method of claim 14, wherein the characterization of the part comprises determining a variation in the spatial distribution with respect to a reference spatial distribution.

16. The method of claim 1, wherein the characterization of the part comprises:

obtaining a temperature of the part or a stress to which the part is subjected;

or obtaining a spatial distribution of a temperature of the part, or of a stress to which the part is subjected.

17. The method of claim 1, wherein the measurements are at least one of:

measurements of eddy currents formed in the part under the effect of excitation of the part by a magnetic field;

measurements of acoustic or mechanical waves propagating through or along the part;

measurement of a light wave reflected by the part when the part is illuminated by an incident light wave, in particular in the infrared or visible domains; or, measurement of the transmission of X-ray or gamma radiation through the part when said part is irradiated by a source of X-ray or gamma radiation.

18. The method of claim 1, wherein the second database comprises a number of data lower than the number of data of the first database.

19. A system for characterizing a part, comprising:

a sensor configured to (a) carry out non-destructive measurements, the sensor being configured to be placed on the part or facing the part, and being configured to measure a physical quantity allowing a mechanical or thermal characterization of the part; and processing circuitry configured to (b) use the measurements as input data of a characterization neural network, the characterization neural network comprising an input layer, established using the input data, and an output layer, comprising at least one node;

(c) depending on the value of the node or of each node of the output layer of the characterization neural network, characterize the part; and prior to b) and c), the processing circuitry is configured to construct a first database, the first database containing measurements of the physical quantity, said measurements being performed or simulated, on a first model part, and parametrize a first neural network, the first neural network being parametrized by parameters defined during a first training operation, using the first database;

wherein the processing circuitry is further configured to:

construct a second database (DB$_2$), containing experimental measurements of the physical quantity performed on the part to be characterized;

perform a second training operation, using the second database, so as to parametrize a second neural network, the second training operation using parameters of the first neural network defined in the first training operation;

such that in b), the characterization neural network used is the second neural network, resulting from the second training operation.

* * * * *